B. F. GALLUP & J. G. STODDARD.
CYLINDER PRESS.
No. 65,962.
Patented June 18, 1867.
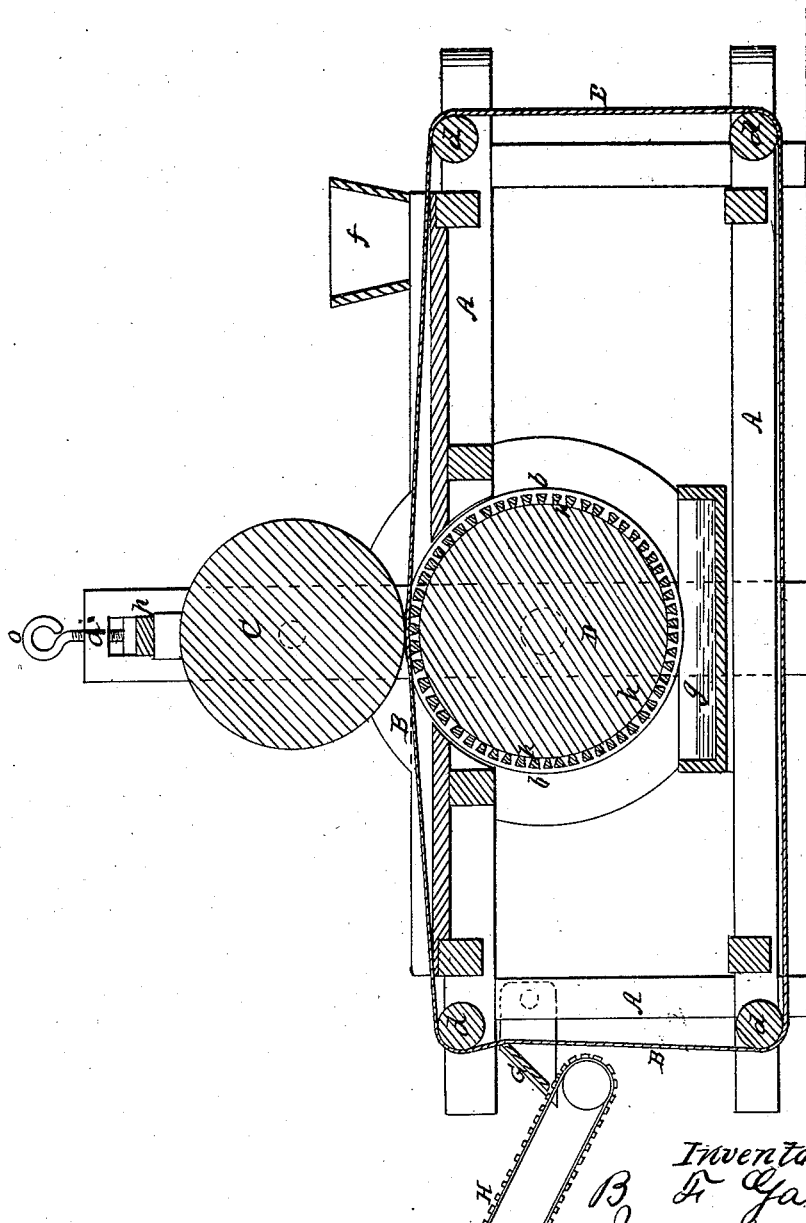
Witnesses
F. A. Jackson
Wm Erwin
Inventor:
B F Gallup
James G Stoddard
Per Munn & Co
Attorneys

United States Patent Office.

JAMES G. STODDARD AND BENJAMIN F. GALLUP, OF GROTON, CONNECTICUT.

Letters Patent No. 65,962, dated June 18, 1867.

IMPROVED CYLINDER PRESS FOR EXTRACTING OIL FROM FISH.

*The Schedule referred to in these Letters Patent and making part of the same.*

TO ALL WHOM IT MAY CONCERN:

Be it known that we, BENJAMIN F. GALLUP and JAMES G. STODDARD, both of the town of Groton, in the county of New London, and State of Connecticut, have invented a new and improved Cylinder Press; and we do hereby declare that the following is a full, clear, and exact description thereof, which will enable others skilled in the art to make and use the same, reference being had to the accompanying drawings, making a part of this specification.

Our invention consists in constructing a rectangular-shaped frame which shall have a revolving apron nearly surrounding it longitudinally, and with transverse cylinders, between which the apron shall run and carry the substance to be pressed by the said cylinders, the lower of which cylinders contains recesses or grooves for the reception of the liquid expressed from the substance which passes between them, as will hereafter be described.

The drawing represents a longitudinal vertical section of the press.

A represents the frame. This is constructed of suitable width and strength, and of form to adapt it to the different parts of the apparatus which it supports. B represents the revolving apron. This apron is revolved between the cylinders, and is sustained by rollers $d$ at each end of the frame in the usual manner. The lower portion of the apron returns below the lower cylinder, as seen in the drawing. C is the upper cylinder. The surface of this cylinder is plain and smooth. It revolves on journals at each end, which lie in slotted upright standards, marked $a$, attached to the sides of the frame. This cylinder rests upon the lower cylinder, the apron being between them, and is pressed down upon the lower cylinder by screws $o$, or levers, with any desired force, in order to increase the power of the press. This force is applied to the journals or bearings before mentioned. To overcome the rigidity of such force, and allow any obstacle or hard substance to pass between the cylinders, springs $p$ may be placed above the journals, the elasticity of which will allow of the passage of such substances between the cylinders in safety. D is the lower cylinder. It is revolved on journals, which are supported by the same standards $a$ that support the upper one. One of the journals extends through the standards, and has a pulley upon it, to which the power is applied which drives the press. It may be driven by a gear-wheel instead of a pulley if desired. As seen in the drawings, this cylinder has a light flange at each end, which is indicated by the letter $b$, between which are the recesses $h$, or dove-tail shaped grooves in the cylinder, extending longitudinally across it.

The especial purpose to which it is proposed to apply this press i to express the oil from fish which have been previously prepared for pressing by being boiled or steamed. In the process of pressing the operation is as follows:

The fish are shovelled into a hopper, shown at $f$, which extends across and above the apron. The apron, being revolved by the cylinder, carries the fish between them, when all the oil and liquid particles are forced out by the pressure. The apron is sufficiently open to allow the oil and liquids thus expressed to run through it, and to be discharged on the cylinder D and into the recesses before mentioned. Some portion of the oil and liquid will drip from the surface of the cylinder and fall into the pan $g$ below, but the larger portion will enter these recesses and be carried forward with the revolution of the cylinder, and be discharged or poured out into the pan. $d$ represents the pan, which has a spout at the end for the discharge of the liquid into the proper vessels. G is a stationary scraper, which takes the substance which remains from the apron and discharges it on to a revolving conveyor-apron, H, which delivers it wherever desired.

Having thus described our invention, what we claim as new, and desire to secure by Letters Patent, is—

1. The arrangement and combination of the cylinders C and D, the apron B, the hopper $f$, and the scraper or chute G, substantially as described and for the purposes herein set forth.

2. We claim the recesses $h$, in combination with the cylinders C and D, substantially as and for the purposes specified.

The above specification of our invention signed by us this 16th day of November, 1866.

JAMES G. STODDARD,
BENJAMIN F. GALLUP.

Witnesses:
N. B. CHURCH,
E. D. AMES.